Oct. 11, 1938.  F. B. THOMSON  2,133,062
METER SEAL
Filed Nov. 8, 1935
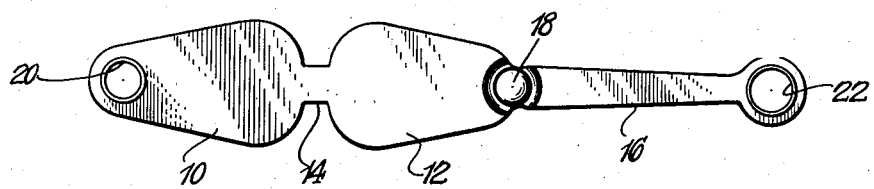
Fig. 1.
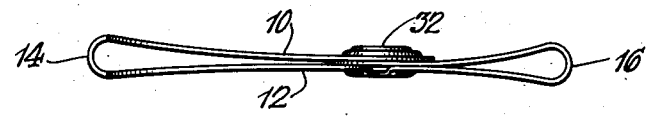
Fig. 2.
Fig. 3.
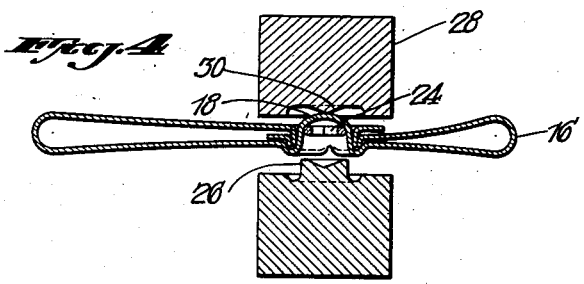
Fig. 4.
Fig. 5.
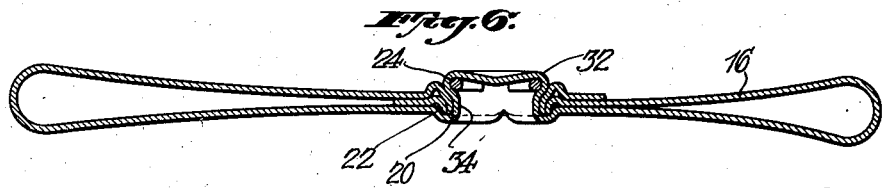
Fig. 6.
Inventor
FREDERICK B. THOMSON.
By His Attorneys Patented Oct. 11, 1938

2,133,062

UNITED STATES PATENT OFFICE 2,133,062

METER SEAL

Frederick B. Thomson, Teaneck, N. J., assignor to Engineering Products Corporation, Inc., New York, N. Y., a corporation of New York Application November 8, 1935, Serial No. 48,794

3 Claims. (Cl. 292—309)

This invention relates to an improved expanded metal fastener of novel form and to a method of quickly and inexpensively producing the same. By way of example, I have illustrated the fastener in connection with a known type of metal seal, wherein two apertured portions are engaged with a protrusion on the seal. The present improvement is directed particularly to the method and means for effecting a fastening of one or more perforated parts around a protruding part by a head on the protrusion, which is expanded laterally to an appreciable extent, so that such head cannot be drawn through the aperture without breakage of the parts. The invention will be fully apparent from the following description, when read in connection with the accompanying drawing, in which—

Fig. 1 is a plan view of a meter seal adapted to have portions thereof fastened in accordance with the present invention; Fig. 2 is a view of the seal after certain parts have been fastened; Fig. 3 is an enlarged section illustrating one step in forming the improved fastening device; Fig. 4 is a view illustrating a further step in the formation of the improved fastening; Fig. 5 is a detail view of an expansible ring adapted to be inserted in the protrusion in forming the improved fastening device; Fig. 6 is an enlarged section illustrating one application of my improved fastener.

Referring in detail to the drawing, Fig. 1 illustrates a plan of a known type of meter seal having thumbprint receiving portions 10 and 12 connected by a weakened portion 14 and having an elongated tie portion 16 adapted, for example, to be passed through apertures in bolts, or thumb screws of a meter to be sealed. The seal is provided with a protrusion 18 which, as illustrated in Fig. 3, is in the form of a hollow button-like projection. In the particular seal illustrated, the portion 10 is provided with an aperture 20, which is adapted to be engaged around the protrusion 18. There is a similar aperture 22 in the extremity of the tie portion 16. It is desirable in meter seals to permanently fasten the parts containing the apertures 20 and 22 by heading over the protrusion 18 in such a manner that the seal cannot be opened without breaking the head or otherwise distorting the seal, so as to reveal the fact that the same has been tampered with. A mere blow with a hammer or other tool would have the riveting effect of heading over the protrusion 18. But, a head so made is not uniform and in some cases there is not secured sufficient spreading of the metal to prevent an unscrupulous, but skillful person, from manipulating the headed over portion, so that it can be forced through the openings 20 and 22.

To avoid this, I provide an improved method and means whereby the metal of the head will be expanded laterally to such an extent that it is impossible to force it through the apertures. My improved fastening involves the inclusion, in the head, of an expanded ring, such as indicated at 24. By the use of such a ring, when applied according to my improved method, the metal at the extremity of the head is expanded laterally for a considerable distance beyond the normal diameter of the protrusion 18 and thus an effective marginal overlap is secured.

In forming the improved fastener, I first insert the expansible ring 24 into the cavity of the protrusion, as indicated by Fig. 3. Thereupon, the portions of the seal having the apertures 20 and 22 therein are folded so that the protrusion extends therethrough. The parts are then subjected to the action of die members 26 and 28, such as shown in Fig. 4. The member 26 is of a size to enter the cavity in the protrusion 18 and to slightly expand the split ring 24. The die member 28 has a blunt, substantially conical, portion 30 which in coaction with the die member 26 is effective to expand the ring and thus distort the metal of the protrusion laterally to a considerable extent, thus forming the overlapping annular bead portion 32, shown in Fig. 6, which is of considerably greater diameter than that of the apertures 20 and 22. Thus, the annular bead extends laterally outward from the body portion 34 of the protrusion and effectively prevents the forcing apart of the thus united parts, except by breakage or fracture which would reveal that the seal had been tampered with.

While not limited thereto, the fastener may be made of relatively light weight metal, such as aluminum, or alternatively can be made of brass, copper, steel, or the like. The expansible ring 24 may be either a split ring, or a solid ring of steel, or other metal. But, it is deemed important to include a ring, which is capable of being expanded laterally by the coaction of cooperating dies so as to form a head having an annular overlapping portion of materially larger diameter than the apertures 20 and 22, which the head overlies. In some cases, it is also considered desirable to expand the metal of the protrusion to a point closely approaching the yield point, or elastic limit of the metal, so that, if an attempt is made to distort the metal by punching the center of it down through the apertures 20 and 22, the metal will be perforated or fractured and thus reveal the fact that the fastening has been tampered with.

While I have described quite precisely the specific meter seal fastener illustrated and have referred to certain definite steps in its production, it is to be understood that the drawing and description are to be interpreted in an illustrative rather than a limiting sense since various modifications and substitutions of equivalents may be made without departure from the invention as defined in the appended claims.

What I claim is:

1. A fastener comprising a strip of metal having a protrusion stamped upwardly and extensions on opposite sides of said protrusion each said extension having an opening and being bent reversely to superpose said openings over said protrusion and with the protrusion projecting therethrough, a ring in said protrusion above said openings, and said ring and the walls of said protrusion being expanded above said openings to prevent removal of the protrusion therethrough.

2. A fastener comprising a strip of metal having a protrusion stamped upwardly and extensions on opposite sides of said protrusion each said extension having an opening and being bent reversely to superpose said openings over said protrusion and with the protrusion projecting therethrough, a split ring in said protrusion above said openings, and said ring and the walls of said protrusion being expanded above said openings to prevent removal of the protrusion therethrough.

3. A fastener comprising a strip of metal having a protrusion pressed upwardly and an extension from one side of said protrusion having an opening and being bent reversely to superpose said opening on said protrusion with the protrusion extending therethrough and a ring within said protrusion, said ring and the wall of the protrusion being expanded above said opening to prevent the removal of said protrusion therethrough.

FREDERICK B. THOMSON.